United States Patent [19]

Nahm, Jr.

[11] 4,310,558

[45] Jan. 12, 1982

[54] EXTRUDED FIBER MIXTURE PET FOOD

[75] Inventor: Lee J. Nahm, Jr., Jefferson County, Mo.

[73] Assignee: Ralston Purina Company, St. Louis, Mo.

[21] Appl. No.: 113,912

[22] Filed: Jan. 21, 1980

[51] Int. Cl.³ ............................................... C12K 1/00
[52] U.S. Cl. .................................... 426/98; 426/99; 426/249; 426/623; 426/630; 426/635; 426/447; 426/448; 426/449; 426/805; 426/250
[58] Field of Search ............... 426/99, 98, 96, 302, 426/307, 623, 630, 635, 805, 249, 447, 448, 449, 250

[56] References Cited

U.S. PATENT DOCUMENTS

| | | | |
|---|---|---|---|
| 3,496,858 | 2/1970 | Jenkins | 426/634 |
| 3,883,672 | 5/1975 | Bone et al. | 426/805 X |
| 3,897,572 | 7/1975 | Riggs et al. | 426/805 X |
| 3,916,029 | 10/1975 | Hildebolt | 426/805 X |
| 3,940,495 | 2/1976 | Fiier | 426/104 |
| 3,959,511 | 5/1976 | Balaz et al. | 426/805 X |
| 3,974,296 | 8/1976 | Burkwall | 426/805 X |
| 3,984,576 | 10/1976 | Burkwall et al. | 426/805 X |
| 4,006,266 | 1/1977 | Bone et al. | 426/805 X |
| 4,020,187 | 4/1977 | McCulloch | 426/805 X |
| 4,055,681 | 10/1977 | Balaz et al. | 426/805 X |
| 4,145,447 | 3/1979 | Fisher et al. | 426/805 X |
| 4,190,679 | 2/1980 | Coffee et al. | 426/805 X |
| 4,229,485 | 10/1980 | Brown et al. | 426/805 X |

FOREIGN PATENT DOCUMENTS

| | | | |
|---|---|---|---|
| 995968 | 8/1976 | Canada | 426/805 |
| 1043624 | 12/1978 | Canada | 426/805 |

*Primary Examiner*—R. B. Penland
*Attorney, Agent, or Firm*—Virgil B. Hill

[57] ABSTRACT

A method of producing a dry pet food product containing fibrous food pieces having a tough, pliable texture combined with a basal matrix containing proteinaceous and farinaceous materials having a porous texture and appearance is disclosed. The fibrous food pieces, which may simulate vegetables, grains and red meat pieces, comprise denatured proteinaceous material. The food pieces are blended with undenatured proteinaceous materials and farinaceous materials. The mixture is mechanically worked under conditions of elevated temperature and pressure and finally extruded to form an expanded dry pet food product having a porous texture interspersed with food pieces having a tough, pliable fibrous texture.

39 Claims, No Drawings

EXTRUDED FIBER MIXTURE PET FOOD

BACKGROUND OF THE INVENTION

This invention relates to a dry pet food product and process comprising forming fibrous food pieces simulating vegetables, grains and red meat, and admixing the pieces with a basal ration so the food pieces are interspersed therein.

Many pet owners desire to vary the diet of their pets for nutritional purposes, aesthetic appeal or to increase the palatability of the ration. Pet owners have a wide choice of food products within the general class of pet foods: (1) dry per foods; (2) semi-moist pet foods; and (3) moist pet foods. Each pet food of the particular subdivision differs from the other pet food subdivisions in that different moisture and palatability levels are achieved. Generally speaking, the palatability level increases as the moisture level is increased. Thus, pet owners will add water and other food materials, i.e., left over table scraps, to dry pet food rations in order to increase its acceptance and palatability.

The addition of vegetable and meat table scraps to dry pet food rations creates the appearance of a stew. Canned or moist pet foods may more closely resemble stews and they may be highly desirable as a consumer item. However, dry pet food products have the advantages of being more economical and more convenient for free choice feeding of the pet. Canadian Pat. Nos. 995,968 and 1,043,624 show a dry pet food resembling a stew when hydrated, providing meat simulating pieces and vegetable simulating pieces of contrasting colors.

With advancing extrusion technology, it has become increasingly efficient to develop meat and vegetable simulating food pieces from inexpensive farinaceous and proteinaceous raw materials. The basic process involves adding moisture to a vegetable protein source material, extruding the material at elevated temperatures and pressures to produce an expanded textured vegetable protein product having a fibrous texture. The basic extrusion process for producing a textured vegetable protein product is disclosed in U.S. Pat. Nos. 3,940,495 and 3,496,858. The process and product of the present invention involve the preparation of simulated fibrous food pieces from farinaceous and proteinaceous materials, particularly soybean protein source material. After the preparation of the food simulating pieces, the soybean protein is denatured. The pieces are then admixed with additional farinaceous and undenatured proteinaceous material to be cooked by extrusion to produce an expanded product containing fibrous food pieces dispersed therein.

SUMMARY OF THE INVENTION

The present invention, therefore, comprises a dry pet food containing less than 15% moisture having a porous texture and appearance with fibrous food simulating pieces having a tough, pliable texture interspersed therein. The fibrous food simulating pieces interspersedly set in the basal ration are derived from primarily proteinaceous and some farinaceous sources and have contrasting colors.

The process involves blending a first mixture to form the simulated food piece comprising about 35 to about 95% by weight proteinaceous materials and about 0 to about 30% by weight farinaceous materials, cooking and extruding the mixture to form fibrous food pieces. The simulated fibrous food pieces containing denatured proteinaceous materials are admixed with a second mixture of farinaceous and undenatured proteinaceous materials, said fibrous food pieces comprising about 18 to about 22% by weight of the mixture. The mixture is then cooked and extruded to yield an expanded dry pet food product having a porous texture and appearance containing food pieces having a tough, pliable fibrous texture. The respective proportions of the fibrous food pieces and basal matrix provide a food product which is of a high degree of esthetic appeal to the consumer, having a fairly uniform mixture of contrastingly colored fibrous food simulating components that retain their particle integrity during production and upon storage.

It is a further object of this invention to provide a pet food product wherein each individual piece thereof resembles a stew or food mixture containing vegetables and meat pieces.

It is another object of the present invention to provide a unique method of producing a dry pet food product wherein denatured proteinaceous material in the form of fibrous food pieces is cooked and extruded with undenatured proteinaceous material and farinaceous material to form an expanded dry pet food.

It is also an object of this invention to provide a method of preparing a dry pet food wherein denatured proteinaceous material is further cooked and extruded in a basal matrix, retaining its particle integrity to produce a stable, palatable pet food product.

DESCRIPTION OF THE PREFERRED EMBODIMENTS

There are two concepts of this invention which pertain broadly to a unique processing treatment of protein containing products to obtain a dry pet food material. Namely, (1) the formation of a dry pet food material having an expanded porous mixture containing fibrous food pieces simulating meat, grains and vegetables interspersedly set therein and (2) a unique processing treatment for the admixing and extrusion cooking of vegetable material in the form of fibrous food pieces thereby denaturing the material and mixing that material with undenatured vegetable protein material in the basal matrix of the dry pet food material.

The term "dry pet food" or "dry pet food material" is defined as one that has a moisture content less than 15% by weight and typically about 10%. Hereinafter, all percentages referred to are understood to be by weight unless specified otherwise and are based upon the weight of the final product.

Conventionally, a dry pet food contains crude protein, crude fat, crude fiber, ash and other minerals and additives. Typical protein components include meat and bone meal and vegetable protein sources such as soybean meal. Other components are also suitable for use in this pet food product.

The fibrous food pieces which are prepared to simulate meat, vegetables and grains are of contrasting colors. With no intention to limit the present invention, the red fibrous food pieces are provided in a preferred embodiment to closely resemble meat, a green component is provided to closely resemble vegetables, such as peas or green beans, and rice is provided as a white component. Optionally, cooked corn is provided as a yellow component. The fibrous food simulating pieces such as those described, are preferably produced from vegetable proteinaceous material, such as soybeans, cottonseed, peanuts, etc., nevertheless, co-extruded pieces of primary protein such as a meat source, i.e., meat meal and meat and bone meal, and vegetable proteinaceous material may also be conveniently employed.

The meat simulating chunks or fibrous pieces of the instant invention include those textured protein materials which are well known in the art for their meat simulating properties. Extruded or expanded textured proteinaceous materials derived for the most part from vegetable proteinaceous sources such as soybeans, cottonseed, peanut, etc., and methods for their production, are disclosed and described in U.S. Pat. Nos. 3,940,495 and 3,496,858. It is not intended that the instant invention be limited in so far as the particular process of producing a meat simulating chunk or fibrous food piece of the instant invention, other than the meat chunk or fibrous food pieces capable of being hydrated without disintegration to provide the chewy texture and mouthfeel characteristics of real meat. Methods of forming the textured vegetable protein material may include, besides extrusion, but should not be limited to, well known processing techniques such as spinning, coagulation, precipitation, radiation, etc. Mixtures of vegetable proteinaceous material and meat sources such as meat meal and meat and bone meal may be combined and prepared as is described in Canadian Pat. No. 1,023,604. A typical formulation for a meat simulating chunk or fibrous food piece utilized in the present invention comprises the following:

TABLE I

| Soybean meal 49% | 94.73 |
|---|---|
| Meat and Bone Meal | 5.0 |
| Sulfur | .2 |
| Yellow color | .015 |
| Red color | .035 |
| Brown color | .02 |
| | 100.00% |

Other meat sources may be included in the formulation such as beef meal, meat meal, poultry meal, fish meal, meat or meat scraps. Dyes are introduced in the formulation so that the food pieces closely resemble the color of meat. The ingredients in the formulation may be mixed and subjected to mechanical working at conditions of elevated temperature and pressure for a time sufficient to convert the mixtures into a flowable substance and then extruded through a restricted orifice into an environment of pressure substantially lower causing moisture evaporation and the formation of a fibrous structure. The fibrous food pieces then may be formed by cutting or other means. With no intention to limit the present invention, the mixture may be cooked at a temperature above 212° F., preferably about 270° to about 310° F. at a pressure of about 300 to about 800 psig. A typical process for producing fibrous food pieces is found in U.S. Pat. No. 3,940,495. The simulated meat chunks are fibrous food pieces, or dried to a moisture content of between about 6–12% by weight and thereafter may be incorporated in the basal matrix at a level of about 17% by weight.

In order to produce a green colored fibrous food piece to resemble a green vegetable, pea flour or meal or other green colored vegetable proteinaceous material may be used as a primary ingredient. With no intention to limit the invention, however, it has been found that soybean meal or other vegetable proteinaceous material such as cottonseed meal or peanut meal, in combination with the appropriate dyes to produce a green color yields a tough fibrous product upon extrusion cooking. The following formulations are typical for producing a food piece resembling a green vegetable, but by no means limiting:

TABLE II

| Soybean meal 49% | 99.69 |
|---|---|
| Sulfur | .2 |
| Yellow color | .06 |
| Blue color | .04 |
| Red color | .01 |
| | 100.00 |

TABLE II (a)

| Ground peas | 10.0000 |
|---|---|
| Soybean meal 49% | 89.7170 |
| Sulfur | 0.20 |
| Green Dye | 0.0830 |
| | 100.00 |

Both formulations may be mixed with sufficient water for processing, mechanically worked and extrusion cooked at elevated temperatures and pressures in the range of about 212° F. to 310° F. and about 300 psig to 800 psig respectively. Upon extrusion the fibrous green food pieces are dried to a moisture content of about 6 to about 12% by weight and can be admixed to the basal matrix at about 3% by weight. The processed fibrous food piece comprises about 35 to about 95% by weight proteinaceous material, about 0 to about 30% by weight farinaceous material and about 0.01 to about 1% by weight coloring ingredients. Farinaceous ingredients are not required in the fibrous food pieces but if they are desired they may include any of the more common grains, such as corn, wheat, barley or oats, etc., and their milled parts such as corn meal, flour, wheat germ or grits, etc.

Other foot pieces do not require elaborate processing prior to being mixed with the basal matrix to produce a dry pet food product. For instance, rice particles may be directly incorporated into the basal matrix in an uncooked condition. The rice produces a white colored piece to be mixed within the basal matrix at levels of about 5% by weight. As an optional ingredient, and for the introduction of a yellow food piece, cooked yellow corn may be added to the matrix. The yellow corn is cracked on a flaking roll and screened to a particle size that passes through a screen with a size less than U.S. Standard #4 (0.187 inches) and greater than U.S. Standard #7 (0.111 inches). After being screened, the corn is then boiled for one hour in a steam kettle and then drained and dried. The corn pieces may then be directly admixed to a basal matrix. The rice and the corn pieces readily withstand the conditions of mechanical working and elevated temperature and pressure found in the extruder for the production of a dry pet food. About 10% corn pieces by weight may readily be admixed to the basal matrix. The bushel weight of all the fibrous food pieces is about 16–35 lbs/bu., preferably 18–20 lbs/bu. before being admixed with the basal ration.

In a preferred embodiment of the present invention, the fibrous food pieces are coated with about 1% by weight fat to make the fibrous pieces tougher and more pliable before they are placed in the basal matrix and subjected to further cooking. This step also adds to the particle integrity and stability of the fibrous food pieces. However, this step may be omitted from the process and a satisfactory product can still be obtained.

The basal matrix comprises a farinaceous-proteinaceous mixture which may include primary farinaceous ingredients which may be any of the more common grains, such as corn, wheat, barley, or oats and their milled parts such as corn meal, flour, wheat germ or grits. Commonly, the farinaceous ingredients will be present in amounts of about 50 to about 75% of the total mass.

The farinaceous-proteinaceous mixture will also include proteinaceous ingredients such as oilseed meal, proteinaceous by-product meals, meats, and microbial protein. The by-product meals include meat meal, poultry meal, and fish meal; the oilseed meals may be soybean meal and cottonseed meal; for example, the microbial protein may be from sources such as torula yeast, petro protein and brewers yeast. These ingredients, are preferably present in the basal matrix in an amount of about 25–50% by weight. In the preferred embodiment, the ratio of farinaceous ingredients to proteinaceous ingredients in the basal matrix may be from about 3:1 to 1:1. The ratio of about 2:1 would be usual. The farinaceous ingredient and a proteinaceous ingredient of the basal matrix together may comprise 55–80% of the total mixture of the basal matrix.

The proteinaceous ingredient will normally be selected to provide the necessary level and balance of protein. Preferably, several proteinaceous ingredients will be present. These ingredients will be selected to balance each other and the farinaceous ingredients whereby the final mixture of basal matrix and fibrous food pieces is balanced with respect to the desired amino acids. For example, the protein of corn is low in tryptophane, an essential amino acid, whereas fish meal is high in these components; similarly wheat is low in lysine whereas meat meal will provide this ingredient. Accordingly, mixtures of complementary ingredients will preferably be used to provide the desired balance.

Optional ingredients in the product (typically present in total amounts of about 1 to about 8%) may include: flavor ingredients, hydrolyzed protein or salt; coloring ingredients and dyes; minerals and vitamins. A typical basal matrix may be prepared from the following ingredients:

TABLE III

| Ingredients | Percentage |
|---|---|
| Yellow Corn | 2–45 |
| Wheat | 5–30 |
| Oats | 0–5 |
| Corn Gluten Feed | 5–8 |
| Corn Gluten Meal | 7–10 |
| Chicken Meal | 0–15 |
| Liver Meal | 0–15 |
| Meat & Bone Meal | 5–25 |
| Meat, Fish or Meat By Products | 0–15 |
| Wheat Germ Meal | 0–3 |
| Dried Skim Milk | 0–3 |
| Flavoring, Dyes | 0–1 |
| Vitamin & Mineral Supplements | 2.0 |
| Animal Fat (Added After Extrusion) | 4–8 |
| | 100 |

This mixture, with sufficient water for processing, is typically mechanically worked at conditions of elevated temperature and pressure, about 212° F. to about 400° F. and about 15 psig to about 300 psig, respectively, for a time sufficient to convert the mass into a flowable substance. It is then extruded through a restricted orifice into atmosphere at a lower pressure causing expansion of the material to form an expanded dry pet food product having a porous texture and appearance. When dried to a moisture content of 10%, it typically has a bushel weight of about 26 to 29 lbs/bu. If this second mixture is cooked separately or combined with the first mixture of fibrous food particles, the conditions of cooking are identical.

OPERATION

The fibrous food pieces are extruded and dried. The extruded fibrous food pieces contained denatured protein. Additional fibrous food pieces such as rice and corn may be added. The mixture is then mixed with the ingredients for the basal matrix containing the undenatured protein. The mixture then is extruded to produce a porous expanded product with fibrous food pieces contained therein that have good particle integrity. Each individual piece of the product is interspersed with fibrous food pieces.

The meat simulating food piece shown in Table I is prepared for extrusion by adding about 8 to about 25% moisture. It is set into the extruder inlet while the extruder screw is rotated at a substantial speed, for example, of about 150 rpm. During this operation, steam is passed through the forward jacket, and normally, cooling water is passed through the rear jacket. The mixture is advanced in the extruder by the screw while its temperature is increased to above 212° F., preferably within the range of 270°–310° F. by the steam heat, by the mechanical working friction, and possibly by chemical changes occurring. The addition of steam and/or water to both jackets is not intended to be limiting to the present invention. Any method known in the art may be utilized for temperature control, such as using water or steam individually in one or both jackets of the extruder cooker. Since the screw tends to advance material faster than it can be passed through the restricted outlet means, the pressure builds up in the extruder, usually to about 300–800 psig, while the product is severely mechanically worked in the extruder. The material is converted to a flowable substance which is forced from the main extrusion chamber, after a retention time of usually 30–40 seconds, into the supplemental chamber. The material remains under elevated pressures and temperatures as it is advanced by pressure differential through the extruder to the dye outlet nozzle. As it emerges from the nozzle under the high internal pressures into the much lower atmospheric pressure, the super heated moisture partially flashes off by evaporating to cause product expansion and partial cooling. If the product is being processed properly, it emerges in the form of a continuous, elongated, expanded, fibrous member which can be severed to individual chunks as it emerges by any ordinary cut off means. The expanded product is porous, fibrous and closely resembles actual meat tissue fibers. The product is very nutritious as it emerges, is sterile, palatable and wholesome. Preferably, the pieces may be spray coated with about 1% fat.

During the extrusion operation, the temperature and pressure of the cooking are controlled to produce a product which will have the desired bulk density when dried. Within the pressure and temperature limits of the extrusion process, the conditions of extrusion are controlled to produce the final product which has a bulk density of about 26 to 29 lbs/bu. when dried to a moisture content of about 10% by weight.

The same procedure is used for preparing the fibrous food simulating pieces having a green color as shown in Table II or II(a).

Broken pieces of brewers #4 rice may then be added to the mixture and optionally yellow corn that is cracked and screened to a particle size of 0.187 inches to about 0.11 inch that is boiled for 1 hour, drained and dried may also be added. The meat simulating fibrous food pieces, the vegetable simulating fibrous food pieces, the rice and optionally the cooked corn pieces are then mixed with the ingredients in the formulation for the basal matrix found in Table III.

The first mixture of the fibrous food pieces simulating red meat, green vegetables, rice and optionally yellow corn is blended with the second mixture of the basal matrix. Preferably, the fibrous food pieces should be admixed to the basal matrix in the following proportions based on the weight of the final product: about 17% red meat pieces; about 5% rice; about 3% green vegetable pieces; and about 10% corn. These amounts are discretionary and are not intended to be limiting. Red fibrous food pieces could be added in amounts ranging from about 3 to 17% by weight, green pieces from about 2 to 10% by weight and rice pieces, about 1-10% by weight. The fibrous food pieces which contain denatured vegetable proteinaceous material are preferably coated with about 1% fat prior to blending with the basal matrix to insure better particle integrity with the extrusion cooking of the basal matrix.

The blended mixture is then extrusion cooked at conditions of elevated temperature and pressure at about 212° F. to about 400° F. and about 15 psig to about 300 psig respectively. The process of this invention may be practiced on a conventional extrusion device, such as that disclosed in U.S. Pat. No. 3,496,858. The rotating screw of the extruder device creates a high pressure on the material mixed in the extruder. It is believed that the particular material changes form until it finally flows in a generally fluent manner, even squeezing around the outer periphery of the screw in a recirculating fashion column to cause a severe mechanical working of the substance. The pressures in the extruder are elevated to about 100 psig and typically will fall within the range of 100-200 psig. All of the pressure and the high temperatures result from the friction between the flowing products and components of the extruder. During the extrusion operation, cooling water is passed through the rear and forward jacket for temperature control. The mixture is converted to a flowable substance which emerges from the nozzle of the extruder and is expanded. The expanded elongated product may be cut and spray coated with about 4 to about 8%, preferably 6% by weight animal fat. The moisture content of the materials and temperatures and pressures of the extrusion must be selected in a manner to produce an extruded product which will have the desired properties. The bulk density of the final product should be in the range of 26 to 29 lbs/bu. after the product has been dried to a moisture content of about 10-12% by weight.

In an alternate embodiment, the basal matrix may be cooked separately in an extruder under identical conditions previously described or any well known method. The fibrous food pieces, which can be prepared from any known process may then be blended with the extruded cooked basal matrix and the mixture passed through a pellet mill for extrusion upon proper preconditioning. Pelleting does not involve mechanically working the material under conditions of elevated temperature and pressure to produce a flowable substance for extrusion. Preconditioning involves bringing the moisture content of the mixture to 25% by steam and water injection. The bushel weight of this pelleted product is in the range of about 44-50 lbs/bu. when dried to a moisture content of 6%.

The product provides an excellent pet food which is palatable and provides unique aesthetic appeal to consumers.

In order to illustrate without unduly limiting the novel aspects of the present invention, the following examples are presented.

EXAMPLE I

Soybean meal, weighing 190 pounds after oil extraction by hexane, was employed. It had a protein content of 49% by weight of the soybean meal, and a fat content of 0.5% by weight. This soybean meal was mixed with 10 pounds meat and bone meal, about 182 grams of sulfur, an extrusion aid, was added to the mixture as well as 9 grams of a yellow color, 18 grams of a red color, and 32 grams of a brown color. The mixture was then fed into a preconditioner where about 20 pounds of water and steam was admixed and then into a conventional extrusion device having steam and water jackets. Cooling water at room temperature was being constantly passed through both jackets. The screw in the extruder was rotated at 150 rpm. The mixture was thus mechanically worked within the extruder at a temperature of around 300° F., with the pressures varying somewhat but being generally above 300 psig. The material was continuously passed through the extruder, passing through the elongated tube and out an extruder nozzle having a size of $\frac{3}{8} \times \frac{1}{4}$ inch. The reaction time of the material within the extruder was about 30 seconds. The mixture was ejected from the nozzle in a continuous stream, and cut. The coherent fibrous structure of the material was expanded upon passage through the nozzle, to form a porous structure. The product, when removed, had a fibrous meatlike texture of excellent quality. The product when dried to a moisture content of 8% had a bushel weight of 18 lbs/bu.

EXAMPLE II

Another run similar to that described in Example I was made, but in this instance green color was provided in the fibrous food pieces by the addition of pea flour and a green coloring dye. About 179 pounds of solvent extractant soybean meal having 49% protein were mixed with 20 pounds of pea flour, about 182 grams of sulfur, and 38 grams of a green coloring dye. The mixture was then placed in a preconditioner with about 20 pounds water. It was extruded in a conventional extruder cooker at conditions recited in Example I. The resulting green colored fibrous food pieces, when dried to a moisture content of 9% had a bushel weight of 18 lbs/bu.

EXAMPLE III

One hundred pounds of a nutritionally balanced farinaceous-proteinaceous material was employed as the basal matrix having the following composition:

| | |
|---|---|
| Ground Corn | 31 parts by weight |
| Wheat | 20 parts by weight |
| Whole Oats | 5 parts by weight |
| Corn Gluten Feed | 8 parts by weight |
| Corn Gluten Meal | 10 parts by weight |

| | |
|---|---|
| Soybean Meal | 5 parts by weight |
| Meat & Bone Meal | 18 parts by weight |
| Vitamin & Mineral Supplements | 3 parts by weight |

This formulation was mixed with the products from Examples I and II and #4 brewers rice in a proportion so that there was about 17% by weight red fibrous food pieces, about 3% by weight green fibrous food pieces, and about 5% by weight rice pieces based on the weight of the basal matrix formulation. Enough water was added to bring the moisture content of the mixture to 25% by weight. A conventional extrusion device was used with water being supplied to the front and rear jackets to maintain an exit water temperature of 160°-200° F. The cooling water at room temperature was constantly passed through both jackets. The opening in the restraining plate was ⅜ inch in diameter, with the screw being rotated at 150 rpm. The mixture was thus mechanically worked within the extruder at a temperature of around 250° F., with the pressures varying, but being generally about 200 psig. The material was continuously passed through the extruder, passing through the elongated tube and out a rectangular extruder nozzle having a size of ⅜×½ inch. The retention time of the material within the extruder was about 30 seconds. The mixture was ejected from the nozzle in a continuous stream and cut and coated with about 6% animal fat. Upon drying to a moisture content of about 10% by weight, the final product had a bushel weight of 26 lbs/bu. The final product had a porous texture interspersed with multicolored food pieces having a tough, pliable fibrous texture.

EXAMPLE IV

This example shows the pelleting of a pre-cooked basal matrix and fibrous food pieces. The nutritionally balanced farinaceous-proteinaceous was employed having the following composition:

| | |
|---|---|
| Corn | 13% |
| Rice | 24% |
| Wheat | 35% |
| Corn Gluten Meal | 14% |
| Meat & Bone Meal | 5% |
| Flavor and Vitamin & Mineral Supplements | 9% |
| | 100% |

The meal was ground and passed through an extruder cooker having an elevated temperature of about 275 and pressure of about 250 psig. Water was added to the extruder jackets for temperature control. The product was extruded through a nozzle having the size of ⅜×½ inch into flakes and once dried to a moisture content of 10% had a bushel weight of 28 lbs/bu. This basal matrix was then ground through a 4/64 Hammermill ® screen and mixed with the fibrous food pieces of Examples I and II and #4 brewers rice in proportions of 17% red fibrous food piece, 3% green fibrous food piece and 5% rice, based on the weight of the basal matrix. This mixture was then preconditioned in a California pellet mill by steam and water injection so that the moisture content was brought up to 25% by weight. The conditioned meal was then passed into the rolls of the pellet mill, and was formed through a ⅜ inch×⅜ inch dye. It was then dried to a moisture content of 6% and had a bushel weight of 49 lbs/bu. It was then sprayed with about 6% animal fat and flavoring agents. The product had a fibrous texture and was interspersed with the multicolored fibrous food pieces.

EXAMPLE V

The pet food product of the instant invention exhibits an increase in palatability and an acceptance which is quite marked and unexpected. Dogs fed free choice often will consume many times as much of the product of this invention as they will consume of a dry, conventional product. The following tables summarize a series of tests conducted with the products of Examples III and IV versus the basal matrix shown in Table III of the instant application which is a standard commercial dog ration. The rations were fed either on a dry basis as in Table A or a wet basis as shown in Table B.

TABLE A

| Ration Fed Dry | Total Consumed (lbs) | Number of Dogs Preferred | Number of Dogs No Preference | Sig. Level | No. of Dogs | No. of Days |
|---|---|---|---|---|---|---|
| 1 | 26.9 | 9 | | | | |
| 3 | 32.3 | 11 | 0 | N.S. | 20 | 4 |
| 2 | 42.9 | 17 | | | | |
| 3 | 27.2 | 3 | 0 | .05 | 20 | 4 |

TABLE B

| Ration Fed Wet | Total Consumed (lbs) | Number of Dogs Preferred | Number of Dogs No Preference | Sig. Level | No. of Dogs | No. of Days |
|---|---|---|---|---|---|---|
| 1 | 78.7 | 20 | | | | |
| 3 | 4.8 | 0 | 0 | .01 | 20 | 4 |
| 2 | 83.4 | 16 | | | | |
| 3 | 26.4 | 4 | 0 | .01 | 20 | 4 |

Ration 1: The extruded product of Example III
Ration 2: The pelleted product of Example IV
Ration 3: The basal matrix, a standard commercial dry pet food ration The tables show the summary in a statistical significance (P<0.01). This statistical significance indicates that there is less than merely 1% chance that no behavioral preference was shown, in other words, more than 99 out of 100 times a dog would prefer the particular treated ration over the control. The "N.S." means not statistical significant, but a numerical response (according to the consumption and number of dogs preferring).

The extruded ration of the present invention was significantly (P<0.01) preferred fed wet and equally preferred fed dry compared to the standard commercial ration. The pelleted product of the present invention was significantly (P<0.01) preferred wet and significantly (P<0.05) preferred dry compared to the standard commercial ration. The results indicate the superiority of the product of the instant invention over the standard commercial dog ration.

The Method of Wilcoxon

The statistical significance is computed by the Wilcoxon test. This test is a well known method of determining the statistical significance of a behavioral response such as an animal choosing to consume more of one particular type of feed than the other when the animal has ready access to both.

The animals used in this test are medium sized adult, healthy dogs. They were chosen from breeds such as pointers, English setters, labradors, whippets and poodles because such breeds after more than 50 years of research have been proven to have more sensitive and consistent palatability responses. Their taste preferences are very reliable in predicting what the overall dog population will prefer. Some breeds, as for example, beagles, are not very reliable as a general rule. Twenty dogs from the select breeds mentioned above were placed in individual pens. There were two bowls placed in each dog's pen over 4 day intervals. One bowl contained the sample to be tested and the other bowl contained the control. Each bowl contained more than the dog could possibly eat during the interval of time in order that the dog would not eat from one bowl merely because the other bowl was empty. Although the dogs were allowed to feed free choice, each day the position of the two bowls was switched in order to discount the possibility that a particular dog might be a position eater. Each dogs consumption was recorded individually. The differences in the amount of the control consumed and the amount of the sample consumed were recorded (hereinafter referred to as "difference") for each individual dog over the period. Each "difference" was given a sign depending upon whether more of the control (+) or more of the sample (−) was consumed. Then each "difference" was assigned a ranking between 1 and 20 (since there were 20 dogs there were 20 differences) depending upon the magnitude of the "difference" but disregarding the sign. In otherwords, the smallest "difference" was assigned the rank 1 and the next largest 2 and so forth, regardless of whether the "difference" was + or −. In the event that more than one dog had the very same magnitude of consumption "difference" then the rankings which would have been assigned to those differences are averaged. For example, if the three smallest "differences" were all of the same magnitude then each difference would be assigned the average of 1, 2 and 3 or $(1+2+3) \div 3$ or 2. Next, each dog's ranking was given the sign which previously had been given to that particular "difference". For example, if the dog having the lowest magnitude of consumption "difference" had consumed more of the control than of the sample, then its ranking of 1 would become +1, which of course corresponds to the + which had been recorded for that dog's consumption "difference." Then the positive and negative rankings are totalled separately. Whichever total is larger is used along with the number of dogs showing a preference as a key for determining the statistical significance from a Wilcoxon probability chart. This statistical analysis is of course used for each sample tested. The Wilcoxon signed rank test is believed to provide a most reliable statistical probability of whether in fact a preference has been made.

It is realized the variations in these and related factors could be readily made within the concept taught herein. Hence, the invention is entitled to be limited only by the scope of the appended claims and the reasonably equivalent methods, apparatuses, and products to those defined therein.

What is claimed is:

1. A method of producing a dry pet food comprising fibrous food pieces having a tough, pliable texture combined with a basal matrix containing proteinaceous and farinaceous materials, said pet food having a porous texture and appearance comprising the steps of;
   (a) mechanically working a first mixture comprising about 35–95% by weight of a proteinaceous material, about 0–30% by weight of a farinaceous material, and sufficient water for processing, at conditions of elevated temperature above about 212° F. and elevated pressure for a time sufficient to convert the mixture into a flowable substance, said flowable substance then being extruded through a restricted orifice into an environment of lower pressure than the condition of elevated pressure, causing moisture evaporation thereby forming an expanded, fibrous food piece;
   (b) forming fibrous food pieces of said first mixture by comminuting said product;
   (c) blending a second mixture comprising proteinaceous and farinaceous materials with sufficient water for processing to form a matrix;
   (d) combining the fibrous food pieces and matrix to form a mass said fibrous food pieces present in an amount sufficient to provide contrasting color to said matrix;
   (e) mechanically working the mass at conditions of elevated temperature above about 212° F. and pressure for a time sufficient to convert the mass into a flowable substance; and
   (f) extruding the flowable substance through a restricted orifice into an environment of lower pressure than the condition of elevated pressure causing expansion of the mass to form an expanded dry pet food product having a porous texture and appearance containing fibrous food pieces having a tough, pliable, fibrous texture.

2. A method according to claim 1 wherein the second mixture comprises about 50–75% farinaceous material and about 50–25% proteinaceous material.

3. A method according to claim 1 wherein said fibrous food pieces comprise about 18–22% by weight of said pet food product.

4. A method according to claim 1 wherein the first mixture is subjected to conditions of elevated temperature and pressure at about 212° F. to about 310° F. and about 300 psig to about 800 psig respectively.

5. A method according to claim 1 wherein the fibrous food pieces have a bushel weight of about 16 to about 35 pounds.

6. A method according to claim 1 wherein the fibrous food pieces are coated with fat in an amount of about 1% by weight.

7. A method according to claim 1 wherein coloring ingredients are added to the first mixture in amounts of about 0.01 to about 1% by weight.

8. A method according to claim 1 wherein the bushel weight of the dry pet food is about 26 to about 29 pounds.

9. A method according to claim 1 wherein the second mixture is subjected to conditions of elevated temperature and pressure at about 212° F. to about 400° F. and about 15 psig to about 300 psig respectively.

10. A method according to claim 1 wherein proteinaceous material of the first mixture is selected from the group consisting of vegetable proteinaceous sources and meat sources.

11. A method according to claim 1 wherein the farinaceous material of the first mixture is selected from the group consisting of corn, wheat, barley, and oats.

12. A method according to claim 1 wherein proteinaceous material of the second mixture is selected from the group consisting of oilseed meal, by-product meals, meats and microbial protein.

13. A method according to claim 1 wherein the farinaceous material of the second mixture is selected from the group consisting of corn, wheat, barley, and oats.

14. A method according to claim 1 wherein uncooked rice pieces are added to the first mixture prior to blending with the second mixture.

15. A method according to claim 1 wherein dried corn pieces are added to the first mixture prior to blending with the second mixture, said corn pieces having a particle size less than about 0.187 in. and greater than about 0.111 in.

16. A method of producing a dry pet food product comprising the steps of;
  (a) blending fibrous food pieces comprising textured vegetable protein pieces with a basal matrix, said textured vegetable protein pieces present in an amount sufficient to provide a contrasting color to said matrix, said matrix comprising proteinaceous and farinaceous material and sufficient water for processing to form a mass;
  (b) mechanically working the mass at conditions of elevated temperature above about 212° F. and elevated pressure for a time sufficient to convert the mass into a flowable substance;
  (c) extruding the flowable substance through a restricted orifice into an environment of lower pressure than the condition of elevated pressure, causing expansion of the mass to form an expanded pet food product having a porous texture and appearance containing fibrous food pieces having a tough, pliable, fibrous texture.

17. A method according to claim 16 wherein said fibrous food pieces include a material selected from the group consisting of uncooked rice particles and cooked corn pieces.

18. A method according to claim 16 wherein said fibrous food pieces comprise about 18–22% by weight of said pet food product.

19. A method according to claim 16 wherein the matrix comprises about 50–75% farinaceous material and about 50–25% proteinaceous material.

20. A method according to claim 16 wherein the ratio of farinaceous to proteinaceous ingredients in said matrix may be from about 3:1 to 1:1 by weight of said matrix.

21. A method according to claim 16 wherein the fibrous food pieces are coated with fat in an amount of about 1% by weight.

22. A method according to claim 16 wherein the textured vegetable protein pieces have a bushel weight of about 16 to about 35 pounds.

23. A method according to claim 16 wherein the mass is subjected to conditions of elevated temperature and pressure at about 212° F. to about 400° F. and about 15 psig to about 300 psig respectively.

24. A method according to claim 16 wherein the pet food has a bushel weight of about 26 to about 29 pounds.

25. A method according to claim 16 wherein proteinaceous material of the matrix is selected from the group consisting of oilseed meal, by-product meals, meats and microbial protein.

26. A method according to claim 16 wherein the farinaceous material of the matrix is selected from the group consisting of corn, wheat, oats and barley.

27. A method of producing a pet food product comprising the steps of;
  (a) blending a basal matrix comprising proteinaceous and farinaceous materials and sufficient water for processing to form a mass;
  (b) mechanically working the mass at conditions of elevated temperature above about 212° F. and elevated pressure for a time sufficient to convert the mass into a flowable substance;
  (c) extruding the flowable substance through a restricted orifice into an environment of lower pressure than the condition of elevated pressure, causing expansion of the mass to form an expanded pet food product having a porous texture and appearance;
  (d) comminuting said expanded product;
  (e) blending fibrous food pieces with said expanded product in an amount sufficient to provide a contrasting color to said product, said fibrous food pieces comprising textured vegetable protein pieces, and preconditioning said blend with a combination of water and steam to a moisture content of about 25%; and
  (f) pelleting said blend to form a pet food product containing fibrous food pieces having a tough, pliable texture.

28. A method according to claim 27 wherein the mass is subjected to conditions of elevated temperature and pressure at about 212° F. to about 310° F. and about 300 psig to about 800 psig respectively.

29. A method according to claim 27 wherein the pelleted product has a bushel weight of about 44 to about 50 lbs/bu. when dried at 6% moisture.

30. A method according to claim 27 wherein proteinaceous material of the basal matrix is selected from the group consisting of vegetable proteinaceous sources and meat sources.

31. A method according to claim 27 wherein the preferred farinaceous material of the basal matrix is selected from the group consisting of corn, wheat, barley, and oats.

32. A method according to claim 27 wherein said fibrous food pieces comprise about 18–22% by weight of said pelleted pet food product.

33. A method according to claim 27 wherein the matrix comprises about 50–75% farinaceous material and about 50–25% proteinaceous material.

34. A method according to claim 27 wherein the ratio of farinaceous to proteinaceous ingredients in said matrix may be from about 3:1 to 1:1 by weight of said matrix.

35. A method according to claim 27 wherein said fibrous food pieces include a material selected from the group consisting of uncooked rice particles and cooked corn pieces.

36. A method according to claim 27 wherein the fibrous food pieces are coated with fat in an amount of about 1% by weight.

37. A method according to claim 27 wherein the mass is subjected to conditions of elevated temperature and pressure at about 212° to about 400° F. and about 15 psig to about 300 psig respectively.

38. The product produced by the process of claim 16.

39. The product produced by the process of claim 27.

* * * * *